US012454614B2

(12) United States Patent
Zhang et al.

(10) Patent No.: US 12,454,614 B2
(45) Date of Patent: Oct. 28, 2025

(54) THERMAL INTERFACE MATERIAL WITH LOW DISPENSING VISCOSITY, LOW VERTICAL FLOW AFTER DISPENSING, AND LOW THERMAL IMPEDANCE AFTER CURE

(71) Applicants: Dow Global Technologies LLC, Midland, MI (US); Dow Silicones Corporation, Midland, MI (US)

(72) Inventors: Jiguang Zhang, Shanghai (CN); Yan Zheng, Shanghai (CN); Chao He, Shanghai (CN); Xuedong Gao, Shanghai (CN); Qianqing Ge, Shanghai (CN); Dorab Bhagwagar, Auburn, MI (US); Peng Wei, Shanghai (CN); Chen Chen, Shanghai (CN); Hongyu Chen, Shanghai (CN)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 474 days.

(21) Appl. No.: 18/004,077

(22) PCT Filed: Sep. 23, 2020

(86) PCT No.: PCT/CN2020/116991
§ 371 (c)(1),
(2) Date: Jan. 3, 2023

(87) PCT Pub. No.: WO2022/061559
PCT Pub. Date: Mar. 31, 2022

(65) Prior Publication Data
US 2023/0257582 A1    Aug. 17, 2023

(51) Int. Cl.
*C08L 83/04* (2006.01)
*C08K 3/08* (2006.01)
*C08K 3/22* (2006.01)
*C08K 5/5419* (2006.01)

(52) U.S. Cl.
CPC ............... *C08L 83/04* (2013.01); *C08K 3/22* (2013.01); *C08K 5/5419* (2013.01); *C08K 2003/0812* (2013.01); *C08K 2003/2296* (2013.01); *C08K 2201/001* (2013.01); *C08K 2201/005* (2013.01)

(58) Field of Classification Search
CPC ...................................................... C08L 83/04
See application file for complete search history.

(56) References Cited

U.S. PATENT DOCUMENTS

| | | | |
|---|---|---|---|
| 6,555,905 B2 | 4/2003 | Yamada et al. | |
| 6,649,258 B2 | 11/2003 | Yamada et al. | |
| 8,440,312 B2 | 5/2013 | Elahee | |
| 2002/0143092 A1 | 10/2002 | Matayabas, Jr. | |
| 2003/0049466 A1 | 3/2003 | Yamada et al. | |
| 2015/0279762 A1 | 10/2015 | Lowe et al. | |
| 2016/0160104 A1 | 6/2016 | Bruzda et al. | |
| 2018/0030327 A1 | 2/2018 | Zhang et al. | |

FOREIGN PATENT DOCUMENTS

| | | |
|---|---|---|
| WO | 2019061288 | 4/2019 |
| WO | 2020133374 | 7/2020 |

*Primary Examiner* — Peter F Godenschwager
(74) *Attorney, Agent, or Firm* — Steven W. Mork

(57) ABSTRACT

Provided is a thermal interface material containing a divinyl polydimethylsiloxane, a chain extender, a crosslinker, 80 volume-percent or more thermally conductive filler, treating agent composition, platinum hydrosilylation catalyst, and up to 0.2 weight-percent hydrosilylation inhibitor; where the wherein weight-percent values are relative to thermal interface material composition weight, volume-percent values are relative to thermal interface material composition volume, the molar ratio of silyl hydride groups to vinyl groups in the thermal interface material composition is 0.4 or more and at the same time is 1.0 or less, and the molar ratio of silyl hydride functionality from the chain extender to silyl hydride functionality from the crosslinker is 13 or more and at the same time 70 or less.

10 Claims, No Drawings

THERMAL INTERFACE MATERIAL WITH LOW DISPENSING VISCOSITY, LOW VERTICAL FLOW AFTER DISPENSING, AND LOW THERMAL IMPEDANCE AFTER CURE

FIELD OF THE INVENTION

The present invention relates to a polysiloxane-based thermal interface material, a method for applying such thermal interface material and articles containing the thermal interface material.

INTRODUCTION

Thermal interface materials (TIMs) provide a thermally conductive bond between two components and are often used in electronic devices to draw heat from a heat source to a heat sink. The efficacy of the TIM material is measurable by the thermal impedance of the TIM between substrates:

$$\Theta = (d/\kappa) + R_{contact}$$

where $\Theta$ is thermal impedance of the TIM, d is the bond line thickness (BLT), $\kappa$ is the thermal conductivity of the TIM and $R_{contact}$ is the sum of contact resistance values of the TIM and adjoining substrates. Lowering thermal impedance values corresponds to increasing the efficacy of heat dissipation through the TIM. It is desirable for the thermal impedance to have a value of less than 0.1 degrees Celsius*square centimeter per Watt (° C.*cm$^2$/W).

One way to lower the thermal impedance of a TIM is to reduce the bond line thickness of the TIM. BLT corresponds to the thickness of the TIM of the TIM between substrates. Generally, TIM material is applied to a substrate at a thickness that can be one millimeter thick and them another substrate is applied and the TIM is compressed between the substrates. Decreasing the BLT is desirable to reduce the thermal impedance and also in order to facilitate the manufacture of smaller devices. Thinner BLTs allow for thinner electronic components, which is desirable as consumers seek smaller cellular phone and other electronic devices. It is desirable for the TIM to be compressible to a BLT of less than 30 micrometers between the substrates.

Thermal conductivity is also important in a TIM. Increasing thermal conductivity serves to reduce thermal impedance and facilitates efficient heat transfer through a TIM between substrates. Increasing thermal conductivity is important as electronic devices become more powerful, and concomitantly generate more heat. It would be further beneficial if the TIM had a thermal conductivity of 6.0 Watts per meter*Kelvin (W/m*K) or more.

Achieving low thermal impedance in a TIM alone is desirable, but it is further desirable to do so while providing a TIM that has a low dispensable viscosity (120 Pascal*seconds (Pa*s) or less) to allow for easy application by printing onto a substrate, while at the same time has high enough low shear viscosity to stay in its original position without expanding, slipping or showing evidence of void formation during a Vertical Drip Test. A challenge with TIM materials is "pump-out" or void formation, typically resulting from a heat source and heat sink having different thermal expansion coefficients and/or inhomogeneity in the TIM materials. Passing the Vertical Drip Test is indicative of a TIM that will have minimal or no pump out and no void formation. While passing the Vertical Drip Test can be attempted simply by increasing the viscosity of the TIM, such an approach can inhibit the ability for the TIM to be dispensed. Hence, the lower dispensable viscosity of 120 Pa*s or less is desirable, but challenging to obtain while passing the Vertical Drip Test.

One approach to achieve low dispensable viscosity while trying to improve Vertical Drip Test performance is to blend an organic solvent with a high viscosity TIM formulation. The solvent lowers the viscosity initially to allow dispensability, but then evaporates to produce a higher viscosity TIM composition after dispensing. However, such formulations require use of an organic solvent that evaporates and undesirably contributes to volatile organic composition (VOC) emission. So it is desirable to provide a TIM that has low dispensable viscosity and passes the Vertical Drip Test without requiring an organic solvent.

BRIEF SUMMARY OF THE INVENTION

The present invention provides a solution to the challenge of obtaining a thermal interface material (TIM) that provides a low thermal impedance (less than 0.1 degrees ° C.*cm$^2$/W) while being sufficiently compressible so as to achieve a bond line thickness (BLT) of 30 micrometer or less when tested according to ASTM D-5470 at 80° C. for 15 minutes under 276 kiloPascals (kPa) (40 pounds per square inch) pressure and while having a dispensable viscosity of 120 Pa*s or less (when tested according to ASTMD4440-15 using an RES-G2 rotational rheometer from TA Instruments equipped with 25 millimeter parallel plates using a strain of 0.01 to 300% and a frequency of 10 radians per second) and that passes the Vertical Drip Test, as described herein below. Desirably, the TIM has all of these characteristics while being free of organic solvents. Even more desirably, the TIM of the present invention also has a thermal conductivity of 6.0 W/m*K or more, preferably 6.5 W/m*K or more as determined by the Thermal Conductivity test method described herein below.

The present invention is a result of discovering a polysiloxane matrix composition comprising a specific silyl hydride-to-vinyl ratio (SiH:Vi ratio) in combination with a particular blend of a linear polysiloxane having two silyl hydride functionalities terminally positioned (di-SiH polysiloxanes) and a polysiloxane having more than two silyl hydride functionalities (multi-SiH polysiloxanes) can achieve a TIM that crosslinks sufficiently to preclude dripping but not crosslinked so extensively so as to preclude compressing to a BLT of 30 micrometers or less and achieving a thermal impedance of less than 0.1° C.*cm$^2$/W. It has been discovered that when the SiH:Vi ratio is 0.4 or more and 1.0 or less and the molar ratio of SiH functionalities from di-SiH polysiloxanes to SiH functionalities from multi-SiH polysiloxanes is 13 or higher and 70 or less then the TIM formulation could be compressed to a BLT of less than 30 micrometers even when crosslinked. If the SiH/Vi ratio is greater than 1.0 and/or ratio of di-SiH polysiloxane SiH functionalities to multi-SiH polysiloxane functionalities is less than 13, the cured TIM tends to become too crosslinked to be compressible to a BLT below 30 micrometers. When the SiH/Vi ratio is less than 0.4, and or when the ratio of di-SiH polysiloxane functionalities to multi-SiH polysiloxane functionalities is greater than 70, pump out can occur due to unreacted polymer.

The inventors have further surprising discovered that in addition to the aforementioned properties, the composition of the present invention is capable of achieving a thermal conductivity of 6.0 W/m*K or greater when the composition comprises a thermally conductive filler composition that 0.5 to 12 weight-percent (wt %) boron nitride relative to composition weight.

In the first aspect, the present invention is a composition comprising: (a) a divinyl polydimethylsiloxane having a viscosity of 30 to 200 milliPascal*seconds; (b) a chain extender that is a linear polysiloxane having two terminal silyl hydride functionalities, one at each end of the molecule; (c) a crosslinker that is a polysiloxane having more than two silyl hydride functionalities; (d) 80 volume-percent or more of thermally conductive filler; (e) a treating agent composition comprising an alkyltrialkoxysilane and a mono-trialkoxysiloxy terminated and trimethylsiloxy terminated dimethylpolysiloxanes with a degree of polymerization of 20-120; (f) a platinum hydrosilylation catalyst; (g) up to 0.2 weight-percent hydrosilylation inhibitor; and wherein weight-percent values are relative to thermal interface material composition weight, volume-percent values are relative to thermal interface material composition volume, the molar ratio of silyl hydride groups to vinyl groups in the thermal interface material composition is 0.4 or more and at the same time is 1.0 or less, and the molar ratio of silyl hydride functionality from the chain extender to silyl hydride functionality from the crosslinker is 13 or more and at the same time 70 or less.

In the second aspect, the present invention is method of applying the composition of the first aspect onto a substrate comprising dispensing the composition of the first aspect onto the substrate.

In a third aspect, the present invention is an article comprising a cured form of the composition of the first aspect in contact with a substrate.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Viscosity" unless otherwise stated refers to: (a) for TIM compositions, including for measuring dispensable viscosity: dynamic viscosity as measured according to ASTMD4440-15 using an RES-G2 rotational rheometer from TA Instruments equipped with 25 millimeter parallel plates using a strain of 0.01 to 300% and a frequency of 10 radians per second; and (b) for individual polysiloxanes: viscosity by ASTM D 445 using a glass capillary Cannon-Fenske type viscometer at 25 degrees Celsius (° C.).

Unless otherwise stated, determine all characterizations of a thermal interface material composition in a non-cured state.

Polysiloxanes comprise multiple siloxane units. Siloxane units are selected from M, D, T and Q type siloxane units. The siloxane units have the following chemical compositions:

M type siloxane unit=$(A_3SiO_{1/2})$

D type siloxane unit=$(A_2SiO_{2/2})$

T type siloxane unit=$(ASiO_{3/2})$

Q type siloxane unit=$(SiO_{4/2})$ where: A can be hydrogen, hydrocarbyl or substituted hydrocarbyls, or any other group such as hydroxyl, alkoxyl or halogen; and where the oxygens represent oxygens shared with other siloxane units so half of each oxygen is associated with the stated siloxane unit. For example "$O_{1/2}$" corresponds to one oxygen shared with another siloxane unit and "$O_{3/2}$" correspond to three oxygens shared with other siloxane units. The average number of each siloxane unit in a molecule is typically identified in a chemical structure by a subscript associated with the siloxane unit. Determine the composition of polysiloxanes by $^1$H, $^{13}$C and $^{29}$Si nuclear magnetic resonance (NME) spectroscopy. Notably, the siloxane units of a polysiloxane can be random, block, partially random and partially block within the polysiloxane unless otherwise stated herein.

The present invention is a thermal interface material (TIM) composition. That is, a composition that is suitable for use as a TIM. The TIM composition is curable, which means it can cure by undergoing crosslinking reactions. The curing occurs by means of hydrosilylation chemistry between vinyl and silyl hydride (SiH) groups. In that regard, the TIM composition comprises vinyl-functional polysiloxanes and silyl hydride functional polysiloxanes. Desirably, none of the polysiloxanes have both vinyl and silyl hydride functionality.

The TIM composition comprises a divinyl polydimethylsiloxane (PDMS). The divinyl PDMS has a viscosity of 30 milliPascal*seconds (mPa*s) or more, preferably 45 mPa*s or more, 60 mPa*s or more and can have a viscosity of 90 mPa*s or more, 100 mPa*s or more, 120 mPa*s or more, 140 mPa*s or more, 160 mPa*s or more, even 180 mPa*s or more, while at the same time has a viscosity of 200 mPa*s or less, 180 mPa*s or less, even 160 mPa*s or less, 140 mPa*s or less, 120 mPa*s or less, 100 mPa*s or less, 80 mPa*s or less or even 60 mPa*s or less. If the viscosity is too high, then the TIM composition viscosity will be too high that 80 volume-percent or more thermally conductive filler will not be able to be included. If the viscosity is too low, then the TIM viscosity can be so low that mechanical properties will be poor and chalking can occur.

Desirably, the divinyl PDMS has terminal vinyl groups and has the following general chemical structure (I):

Vi(CH$_3$)$_2$SiO—[(CH$_3$)$_2$SiO]$_n$—Si(CH$_3$)$_2$Vi    (I)

where: "Vi" refers to a vinyl group (—CH=CH$_2$) and n refers to the average number of dimethylsiloxane units, which is the degree of polymerization (DP) for the PDMS. Select n so as to achieve the desired viscosity for the divinyl PDMS. Typically, n is a value of 25 or more, and can be 30 or more, 35 or more, 40 or more, 45 or more, 50 or more, 60 or more 70 or more, 80 or more, even 90 or more while at the same time is typically 200 or less, 190 or less, 180 or less, 170 or less, 160 or less, 150 or less, 140 or less, 130 or less, 120 or less, 100 or less, 90 or less, 80 or less, 70 or less, 60 or less, even 50 or less.

The concentration of divinyl PDMS in the TIM composition is desirably 2 weight-percent (wt %) or more, and can be 3 wt % or more, even 4 wt % or more while at the same time is typically 10 wt % or less and can be 8 wt % or less, 6 wt % or less or even 4 wt % or less with wt % based on TIM composition weight. Too much divinyl PDMS results in a decrease in the amount of thermally conductive filler that can be included due to high viscosity. Too little divinyl PDMS results in a TIM composition that requires so much filler that the composition loses dispensability.

Suitable divinyl PDMS materials can be made by ring-opening polymerization of cyclosiloxanes with vinyl end blockers for termination as taught in U.S. Pat. No. 5,883, 215A.

The TIM composition comprises a chain extender that is a linear polysiloxane having two terminal silyl hydride functionalities, one at each end of the molecule. A linear polysiloxane comprises primarily M and D type siloxane units, but can comprise T and/or Q type siloxane units at a combined concentration of up to 5 mole-percent (mol %), preferably up to 4 mol %, up to 3 mol %, up to 2 mol %, up to one mol %, and most preferably is free of T and Q siloxane units, where mol % T and Q siloxane units are relative to total number of siloxane units in the linear polysiloxane. The linear polysiloxane chain extender has terminal M groups that each comprise a SiH functionality.

The chain extender desirably has a viscosity of 5 mPa*s or more, and can have a viscosity of 7 mPa*s or more, 10 mPa*s or more, 20 mPa*s or more, even 30 mPa*s or more while at the same time generally has a viscosity of 100 mPa*s or less, and can have a viscosity of 75 mPa*s or less, 50 mPa*s or less, 25 mPa*s or less, 20 mPa*s or less, 15 mPa*s or less, even 10 mPa*s or less. If the viscosity is too high, then the TIM composition viscosity will be too high that 80 volume-percent or more thermally conductive filler will not be able to be included. If the viscosity is too low, then the TIM viscosity can be so low that mechanical properties will be poor and chalking can occur.

Desirably, the chain extender is a PDMS having a SiH functionality at each end (a silyl hydride terminated PDMS). Such a PDMS can have the following general chemical structure (II):

$$H(CH_3)_2SiO-[(CH_3)_2SiO]_m-Si(CH_3)_2H \quad (II)$$

Select the value for subscript m to achieve a desired viscosity, such as those taught previously above for the chain extender. Desirably, subscript m has an average value of 10 or more, 11 or more, 12 or more, 13 or more, even 14 or more while at the same time is typically 20 or less, 19 or less, 18 or less, 17 or less, 16 or less, even 15 or less. An example of one suitable chain extender is hydride terminated PDMS with a viscosity of 7-10 mPa*s and containing 1.25 wt % vinyl (commercially available from Alfa Chemistry as ACM83817714 and from Gelest as DMS-V21).

The concentration of chain extender can be 0.5 wt % or more, 0.75 wt % or more, 1.0 wt % or more, even 1.25 wt % or more while at the same time is generally 2.0 wt % or less, 1.75 wt % or less, 1.5 wt % or less and can be 1.25 wt % or less, or even 1.0 wt % or less based on TIM composition weight. This concentration range is most suitable for achieving the desired SiH/Vi ratio and ratio of molar ratio of silyl hydride functionality from the chain extender to silyl hydride functionality from the crosslinker, which is necessary to achieve crosslinking density and final hardness of the TIM composition.

Suitable chain extenders include a hydride terminated PDMS commercially available as DMS-H11 from Gelest.

The TIM composition comprises a crosslinker that is a polysiloxane having more than two silyl hydride functionalities, preferably 3 or more silyl hydride functionalities. Desirably, the viscosity of the crosslinker is 10 mPa*s or more, 12 mPa*s or more, 14 mPa*s or more, 15 mPa*s or more, 16 mPa*s or more, 18 mPa*s or more even 19 mPa*s or more while at the same time is typically 30 mPa*s or less, 25 mPa*s or less, 20 mPa*s or less, even 19 mPa*s or less. These viscosity ranges are desirable to achieve proper TIM composition viscosities at the specified component concentrations.

Desirably, the crosslinker is a linear polysiloxane. The crosslinker desirably is a linear polysiloxane that is trimethyl terminated on both ends. The crosslinker can have average chemical structure (III):

$$(CH_3)_3SiO-[(CH_3)HSiO]_y-[(CH_3)_2SiO]_x-Si(CH_3)_3 \quad (III)$$

where A is as described previously for siloxane units, but is desirably in each occurrence selected from methyl and phenyl, and is most preferably in each occurrence methyl; and where the average value of y is 3 or more and at the same time 10 or less, 8 or less, 6 or less, even 4 or less; and x is selected so as to achieve a desired viscosity for the overall crosslinker.

The crosslinker can be present at a concentration of 0.005 wt % or more, 0.01 wt % or more, 0.02 wt % or more, 0.03 wt % or more, even 0.04 wt % or more while at the same time is typically present at a concentration of 1.5 wt % or less, 1.25 wt % or less, 1.0 wt % or less, 0.75 wt % or less, 0.50 wt % or less, 0.25 wt % or less, 0.010 wt % or less, 0.075 wt % or less, 0.06 wt % or less, or even 0.05 wt % or less relative to TIM composition weight. This concentration range is most suitable for achieving the desired SiH/Vi ratio and ratio of molar ratio of silyl hydride functionality from the chain extender to silyl hydride functionality from the crosslinker, which is necessary to achieve crosslinking density and final hardness of the TIM composition.

Suitable crosslinkers include materials commercially available under the names DMS-071 and DMS-301 from Gelest and DOWSIL™ 6-3570 from Dow, Inc. (DOWSIL is a trademark of The Dow Chemical Company).

The TIM composition has a molar ratio of silyl hydride to vinyl groups that is 0.1 or more, 0.2 or more, 0.3 or more, 0.4 or more, 0.5 or more, 0.6 or more, 0.7 or more, 0.8 or more and can be 0.9 or more while at the same time is 1.0 or less, and can be 0.9 or less, even 0.8 or less. If the molar ratio exceeds 1.0 there is a likelihood that the composition will be too rigid to compress to a bond line thickness of 30 micrometers or less. If the molar ratio is less than 0.1, there is a risk of failing the Vertical Drip Test due to insufficient crosslinking.

The TIM composition has a molar ratio of silyl hydride functionality from just the chain extender to silyl hydride functional from the crosslinker that is 13 or more, 15 or more, 16 or more, 18 or more, 20 or more, 22 or more 24 or more, 26 or more, 28 or more, 30 or more, 35 or more, 40 or more, 45 or more, even 50 or more while at the same time is typically 70 or less, 65 or less, 60 or less, 55 or less, 50 or less, 45 or less, 40 or less, 35 or less, 30 or less even 25 or less. If the molar ratio exceeds 70 there is a risk that the composition will be become too rigid to compress to a bond line thickness of 30 micrometers or less. If the molar ratio is less than 13, there is a risk of failing the Vertical Drip Test.

The TIM composition comprises 80 volume-percent (vol %) or more and typically 98 vol % or less, preferably 95 vol % or less and can contain 94 vol % or less, 93 vol % or less, 92 vol % or less, 91 vol % or less, 90 vol % or less, 89 vol % or less, 88 vol % or less, 87 vol % or less, 86 vol % or less, 85 vol % or less, 84 vol % or less, 83 vol % or less, even 82 vol % or less or 81 vol % or less of thermally conductive filler.

The thermally conductive filler can be any one or any combination of more than one thermally conductive filler known for use in TIM compositions, for example any one or combination of more than one selected from aluminum, silver, copper, aluminum nitride, aluminum oxide, zinc oxide, aluminum nitride, boron nitride, silver coated aluminum, carbon fibers, and graphite. Desirably the thermally conductive filler is any one or any combination of more than one selected from a group consisting of zinc oxide, aluminum and boron nitride.

Desirably, the thermally conductive filler is a combination of at two or three different sizes of filler selected from: small (D50 of less than one micrometer), medium (D50 between one and 5 micrometers) and large (D50 greater than 5 micrometers, preferably 8 micrometer or more, and less than 200 micrometers). Determine D50 for thermally conductive fillers using a laser diffraction particle size analyzer (for example CILAA920 Particle Size Analyzer or Beckman Coulter LS 13 320 SW) operated according to the operation software with values reported in number average particle size.

One desirably thermally conductive filler comprises zinc oxide filler with a D50 less than one micrometer, aluminum filler with a D50 between one and 20 micrometers and optionally at least type of boron nitride flake with a particle size of 8 to 30 micrometers. Surprisingly, it has been discovered that when boron nitride flake is present at a concentration of one wt % or more, preferably 1.5 wt % or more, more preferably 2.0 wt % or more, 2.5 wt % or more, even 3.0 wt % or more while at the same time 10 wt % or less, preferably 8 wt % or less, 7 wt % or less, 6 wt % or less, 5 wt % or less, 4 wt % or less, even 3 wt % or less of the TIM composition weight then the thermal conductivity of the TIM composition is particularly high, even greater than 6.0 Wats per meter Kelvin (W/m*K). A particularly desirable combination of thermally conductive filler that results in a thermal conductivity of 6.5 W/m*K comprises 44 to 48.6 wt % aluminum filler with a D50 of 9 micrometers, 25 to 26 wt % aluminum filler with a D50 of 2 micrometers, 17-18 wt % zinc oxide with a D50 of 0.2 micrometers, 3 to 4 wt % boron nitride flake with an average size of 30 micrometers and up to 1.6 or even up to 2.0 wt % boron nitride flake with an average size of 8 micrometers, with wt % relative to TIM composition weight.

The TIM composition comprises a treating agent composition. The treating agent composition comprise an alkyltrialkoxysilane and a mono-trialkoxysiloxy terminated and trimethylsiloxy terminated dimethylpolysiloxane. The alkyltrialkoxysilane is desirably a 6 to 12 carbon (C6-C12) alkyl trimethoxy silane, preferably a C8-C12 alkyl trimethoxy silane and can be n-decyltrimethethoxy silane. Suitable alkyltrialkoxysilanes include n-decyltrimethoxysilane, available from Dow, Inc. as DOWSIL™ Z-6210 Silane (DOWSIL is a trademark of The Dow Chemical Company).

The mono-trialkoxysiloxy terminated and trimethylsiloxy terminated dimethylpolysiloxane desirably has a degree of polymerization of 20 or more, and can be 30 or more, 40 or more, 50 or more, 60 or more, 70 or more, 80 or more, even 90 or more while at the same time is typically 150 or less, 140 or less, 130 or less, 120 or less 110 or less, 100 or less, 90 or less, 80 or less, 70 or less, 60 or less, 50 or less, 40 or less, even 30 or less. Longer chain lengths (degree of polymerization of 20 or more) are desirable because they have greater stability than shorter chains. However, it is desirable to keep the degree of polymerization below 150 because shorter chain lengths have better efficienty to lower viscosity than longer chain lengths.

Examples of suitable mono-trialkoxysiloxy terminated and trimethylsiloxy terminated dimethylpolysiloxanes have chemical structure (IV):

$$(CH_3)_3SiO-[(CH_3)_2SiO]_a-Si(OCH_3)_3 \qquad (IV)$$

where subscript a has a value equal to the degree of polymerization described above for the mono-trialkoxysiloxy terminated dimethylpolysiloxane.

Suitable mono-trialkoxysiloxy terminated and trimethylsiloxy terminated dimethylpolysiloxanes can be synthesized according the teachings in US2006/0100336.

Desirably, the alkyltrialkoxysilane is typically present at a concentration of 1.8 wt % or more, 2.0 wt % or more, 2.5 wt % or more, 3.0 wt % or more, even 3.5 wt % or more, while at the same time is typically present at a concentration of 4.0 wt % or less, 3.5 wt % or less, or even 3.0 wt % or less with wt % relative to TIM composition weight.

Desirably, the mono-trialkoxysiloxy terminated and trimethylsiloxy terminated dimethylpolysiloxane is present at a concentration of 0.05 wt % or more, 0.1 wt % or more, 0.2 wt % or more, 0.3 wt % or more or even 0.4 wt % or more while at the same time is typically present at a concentration of 0.5 wt % or less, 0.4 wt % or less, 0.3 wt % or less, or 0.2 wt % or less relative to TIM composition weight.

The TIM composition comprises a platinum hydrosilylation catalyst. Platinum hydrosilylation catalysts include Speier's catalysts ($H_2PtCl_6$) and Karstedt's catalyst (platinum(0)-1,3-divinyl-1,1,3,3,-tetramethyldisiloxane complex). The catalyst can be encapsulated or not encapsulated. Encapsulated catalyst is typically catalyst encapsulated in a phenyl resin.

The platinum hydrosilylation catalyst is typically present at a concentration of 0.1 wt % or more, 0.2 wt % or more and can be 0.3 wt % or more while at the same time is typically present at a concentration of 0.5 wt % or less, 0.4 wt % or less, even 0.3 wt % or less relative to TIM composition weight.

The TIM composition can comprise a hydrosilylation inhibitor at a concentration of up to 0.2 wt % of the TIM composition weight. The hydrosilylation inhibitor can be, for example, is methyl(tris(1,1-dimethyl-2-propynyloxy))silane. Desirably, the inhibitor is present and delivered in a vinyl dimethyl terminated PDMS.

Desirably, the TIM composition is free of organic solvent and even more desirably is free of any solvent.

The TIM composition of the present invention is particularly useful in a process where the TIM composition is dispensed onto a substrate. In particular, the TIM composition of the present invention can be printed onto a substrate in a particularly pattern by a process that includes dispensing the TIM composition onto a substrate by printing the TIM composition onto the substrate. Even more beneficial is the fact that once dispensed onto a substrate a second substrate can be applied over and pressed against the TIM composition to form a TIM composition between two substrates that has a bond line thickness of 30 micrometers or less.

The present invention further includes an article comprising the TIM composition dispensed onto a substrate, preferably located between two substrates.

EXAMPLES

Materials. Table 1 lists the materials for use in the sample formulations.

TABLE 1

| Component | Description | Source |
|---|---|---|
| Treating Agent 1 | n-decyltrimethoxysilane | Available from Dow, Inc. as DOWSIL™ Z-6210 Silane |
| Treating Agent 2 | $(CH_3)_3SiO[(CH_3)_2SiO]_{30}Si(OCH_3)_3$ | Synthesize according the teachings in US2006/0100336 |
| Treating Agent 3 | $(CH_3)_3SiO[(CH_3)_2SiO]_{60}Si(OCH_3)_3$ | Synthesize according the teachings in US2006/0100336 |
| Treating Agent 4 | $(CH_3)_3SiO[(CH_3)_2SiO]_{110}Si(OCH_3)_3$ | This can be synthesized according the teachings in US2006/0100336 |
| Divinyl PDMS 1 | $Vi(CH_3)_2SiO—[(CH_3)_2SiO]_{45}—Si(CH_3)_2Vi$ where "Vi" refers to a vinyl group. | Synthesize by ring-opening polymerization of cyclosiloxanes with vinyl end blockers for termination as taught in U.S. Pat. No. 5,883,215A |
| Pt Catalyst 1 | 40 wt % platinum based catalyst of 1,3-diethenyl-1,1,3,3-tetramethyldisiloxane complex encapsulated with phenyl resin. Phenyl resin has 78 mol % monophenylsiloxane units and 22 mol % dimethylsiloxane units, a softening point of 80-90° C. The resin further comprises 55 wt % dimethylvinylsiloxy-terminated PDMS having viscosity of 2 Pa*s at 25° C. and a vinyl content of 0.2 percent by weight; and 5 wt % hexamethyldisilazane-treated fumed silica. Pt content is 0.16 wt % of the Pt Catalyst 1. | Prepare according to methods described in U.S. Pat. No. 4,766,176. |
| Inhibitor 1 | 2.5 wt % methyl(tris(1,1,-dimethyl-2-propynyloxy))silane dissolved in 97.5 wt % vinyl dimethyl terminated PDMS with nominal viscosity of 78 mPa*s and 1.25 wt % vinyl. | methyl(tris(1,1,-dimethyl-2-propynyloxy))silane is commercially available from Alfa Chemistry as ACM83817714; PDMS available from Gelest as DMS-V21. |
| Chain Extender 1 | Hydride terminated PDMS with viscosity of 7-10 mPa*s and 0.16 wt % SiH. | Commercially available as DMS-H11 from Gelest. |
| Crosslinker 1 | Trimethyl terminated dimethyl-co-hydrogenmethyl polysiloxane with nominal viscosity of 19 mPa*s and 0.11 wt % SiH. | Commercially available as DMS-071 from Gelest. |
| Crosslinker 2 | Trimethyl terminated dimethyl-co-hydrogenmethyl polysiloxane with nominal viscosity of 15 mPa*s and 0.78 wt % SiH. | Commercially available as DOWSIL™ 6-3570 Polymer from Dow, Inc. |
| Crosslinker 3 | Trimethyl terminated dimethyl-co-hydrogenmethyl polysiloxane with nominal viscosity of 14 mPa*s and 0.36 wt % SiH. | Commercially available as DMS-301 from Gelest. |
| Crosslinker 4 | Trimethyl terminated dimethyl-co-hydrogenmethyl polysiloxane with a nominal viscosity of 19 mPa*s and 0.10 wt % SiH. | Commercially available as HMS-071 from Gelest. |
| TC filler 1 (BN) | Boron nitride flake with average size of 8 micrometers (μm) | Available from Saint Gobain as UHP-1K |
| TC filler 2 (BN) | Boron nitride flake (30 μm average size) | Available from Momentive Performance Materials as Polartherm™ PT-110. |
| TC filler 3 (Al) | Spherical aluminum filler (D50 of 9 μm) | Available from Toyal America as TCP-9 |
| TC filler 4 (Al) | Spherical aluminum filler (D50 of 2 μm) | Available from Toyal America as TCP-2 |
| TC filler 5 (ZnO) | Zinc oxide filler (0.2 μm average particle size) | Available from Zochem as Zoco-102 |
| TC filler 6 (AlN) | Irregularly shaped aluminum nitride (2 μm average size) | Available from TOYO as TFZ A02P |
| TC filler 7 (AlN) | Irregularly shaped aluminum nitride (10 μm average size) | Available from TOYO as TFZ A10P |
| TC filler 8 (AlN) | Irregularly shaped aluminum nitride (one μm average size) | Available from Maruwa as ANF-A01-WR1 |

DOWSIL is a trademark of The Dow Chemical Company
Polartherm is a trademark of Momentive Performance Materials Inc.

Characterization Methods. Characterize samples according to the following methods.

Dispensable Viscosity. Dispensable Viscosity is a measure of how easily a TIM formulation can be disposed onto a substrate by printing. If the viscosity is too high, then it is difficult to print the TIM formulation precisely and accurately. The present invention achieves a Dispensable Viscosity of 120 Pa*s or less. Determine Dispensable Viscosity using the dynamic viscosity test method of ASTM D4440-15 using an ARES-G2 rheometer by TA Instruments equipped with 25 millimeter parallel plates. Testing conditions are based on strain sweep conducted at 25° C., strain of 0.1 to −300% and frequency of 10 radians per second.

Bond Line Thickness and Thermal Impedance. Determine bond line thickness (BLT) and Thermal Impedance for a TIM formulation following ASTM D-5470 using LongWin Model LW 9389 TIM Thermal Interface Material Tester. The pressure applied to the TIM material sample is 275.9 kilo-Newtons per square meter (40 pounds per square inch). Testing time for each sample is 15 minutes and the temperature is 80° C.

Vertical Drip Test. Apply 0.2 grams of TIM formulation onto a piece of aluminum panel. Place two 0.2 millimeter plastic shims on either side of the sample and place a one millimeter thick slide cover glass on top of the TIM formulation and press against the formulation to achieve a 0.2 millimeter thick film of the TIM formulation between the cover slide cover glass and the aluminum panel. Clamp the cover glass and aluminum panel together with clips to hold them in place and position the assembly vertically in a Temperature Cycling Chamber (PSL-2J by ESPEC Corp.). Cycle the temperature between −40° C. and 125° C. with a 15 minute ramp between each temperature limit, with a hold time of 15 minutes at each temperature limit. After 500 cycles, evaluate the sample. The TIM formulation "passes" the Vertical Drip Test if there is no evidence of expansion or sliding of the TIM formulation from between the slide cover glass and aluminum panel and there is little or no voids formed or pump-out of the TIM formulation observed.

Thermal Conductivity. Measure thermal conductivity of a TIM formulation according to ISO 22007-2:2015 test method using Hot Disk Instrument TPS 2500 S from Hot Disk AB, Goteborg, Sweden. Use a C5501 sensor, 2-5 second heat time and 500 milliWatt power. Fill two cups with TIM formulation and put the planar sensor inside. Use fine-tuned analysis with temperature drift compensation and time correction selected between points 50-150.

Sample TIM Formulations

Formulation Preparation. Prepare sample formulations by combining the components in a 100 milliliter (mL) speed-mixer cup. Into the 100 mL speed-mixer cup add the treating agents, silicone oil including vinyl PDMS, chain extender and crosslinker. Then add the small and middle sized thermally conductive fillers and mix with a FlackTek speed mixer at 100 revolutions per minute (RPM) for 20 seconds. Add in large thermally conductive filler in two portions, mixing at 1000 RPM for 20 seconds and 1500 RPM for 20 seconds after each addition. If applicable, add the BN filer and mix at 1000 RPM for 20 seconds and then 1500 RPM for 20 seconds to achieve a flowable metal-polyorganosiloxane mixture. Add catalyst and mix at 800 RPM for 20 seconds two times. Determine viscosity, thermal conductivity and Vertical Drip test performance. Cure the formulation in an oven at 100° C. for one hour before testing for bond line thickness and thermal impedance.

All of the sample formulations are free of organic solvents.

Outside scope of SiH/Vi ratio and molar ratio of SiH functionality from the chain extender to SiH functionality from crosslinker. Samples 1-7 illustrate TIM formulations that have SiH/Vi ratios greater than 1.0 or molar ratio of SiH from the chain extender to SiH functionality from crosslinker that is less than 13. The results indicate that in either of these situations the formulation is unable to compress to a BLT of 30 micrometers or less. Notably, all of these formulation have a Dispensable Viscosity of 120 Pa*s or less.

It is notable that Sample 7 has a SiH/Vi ratio of 1.0 and yet a BLT of 320 micrometers. While this particular sample illustrates a formulation that is unable to achieve a BLT of 30 micrometers or less, it is approaching 30 micrometers relative to Samples 1-6. Sample 23 (see Table 3) shows that when the SiH/Vi ratio is 1.0 a BLT of 30 micrometers or less is achievable if the SiH CE/SiH crosslinker ratio is increased enough.

Table 2 presents the formulations for Samples 1-7 and the characterization of those samples. Formulations identify the components in grams used to prepare the formulation.

TABLE 2

| | Sample | | | | | | |
|---|---|---|---|---|---|---|---|
| | 1 | 2 | 3 | 4 | 5 | 6 | 7 |
| Component | | | | | | | |
| Treating Agent 1 | 0.29 | 0.29 | 0.29 | 0.29 | 0.29 | 0.29 | 0.29 |
| Treating Agent 3 | 0 | 0 | 0 | 0 | 2.9 | 2.9 | 2.9 |
| Treating Agent 4 | 2.9 | 2.9 | 2.9 | 2.9 | 0 | 0 | 0 |
| Divinyl PDMS 1 | 2.68 | 2.66 | 2.55 | 2.66 | 2.55 | 2.66 | 2.55 |
| TC filler 3 (Al) | 48.58 | 45.38 | 45.38 | 48.58 | 50.26 | 50.26 | 50.26 |
| TC filler 4 (Al) | 25.13 | 25.13 | 25.13 | 25.13 | 25.13 | 25.13 | 25.13 |
| TC filler 2 (BN) | 3.02 | 0 | 0 | 3.02 | 0 | 0 | 0 |
| TC filler 5 (ZnO) | 17.38 | 17.38 | 17.38 | 17.38 | 17.38 | 17.38 | 17.38 |
| Crosslinker 1 | 0.79 | 0 | 0 | 0 | 0 | 0 | 0 |
| Crosslinker 3 | 0.03 | 0.032 | 0.045 | 0.032 | 0.032 | 0.01 | 0.015 |
| Chain Extender 1 | 0 | 0.81 | 0.88 | 0.81 | 1.21 | 1.15 | 1.02 |
| Pt Catalyst 1 | 0.22 | 0.22 | 0.22 | 0.22 | 0.22 | 0.22 | 0.22 |
| Inhibitor 1 | 0.09 | 0.09 | 0.09 | 0.09 | 0.09 | 0.09 | 0.09 |
| Characterization | | | | | | | |
| SiH/Vi molar ratio | 0.56 | 0.81 | 0.94 | 0.81 | 1.22 | 1.17 | 1.0 |
| SiH chain extender/SiH crosslinker molar ratio | 0 | 10.125 | 7.82 | 10.125 | 15.13 | 46 | 27.2 |
| Thermal Conductivity (W/m*K) | 6.5 | NM* | NM* | 6.5 | 6.0 | 6.0 | 6.0 |
| BLT (micrometers) | | | >1000 | | | | 320 |
| Thermal Impedance (° C.*cm$^2$/W) | | | >1.0 | | | | 0.78 |
| Vertical Drip Test | | | Pass | | | | Fail** |

*NM = not measured
**failed due to formation of voids and pump-out of TIM formulation.

In-scope of SiH/Vi ratio and molar ratio of SiH chain extender functionality to SiH crosslinker functionality. Samples 8-23 illustrate TIM formulations that have SiH/Vi ratios of 1.0 or less and a molar ratio of chain extender SiH to crosslinker SiH functionality that is 13 or greater. The results indicate when these ratios are met the formulations can form a BLT of less than 30 micrometers as well as achieve a Thermal Impedance of less than 0.1° C.*cm²/W, Dispensable Viscosity of 120 Pa*s or less and pass the Vertical Drip Test. Moreover, samples that include boron nitride thermally conductive filler have particularly high thermal conductivity values that exceed 6.0 W/m*K. Notably, all of these formulation have a Dispensable Viscosity of 120 Pa*s or less.

Table 3 presents the formulations for Samples 8-23 and the characterization of those samples. Formulations identify the components in grams used to prepare the formulation. Note: "TA"=Treating Agent. "TCF"=TC filler. "CE"=Chain Extender. "TC"=thermal conductivity. "TI"=Thermal Impedance.

"VDP"=Vertical Drip Test

TABLE 3

| | Sample | | | | | | | |
|---|---|---|---|---|---|---|---|---|
| | 8 | 9 | 10 | 11 | 12 | 13 | 14 | 15 |
| Component | | | | | | | | |
| TA 3 | 2.9 | 2.9 | 2.9 | 2.9 | 2.9 | 2.9 | 2 | 2.9 |
| TA2 | 0 | 0 | 0 | 0 | 0 | 0 | 1 | 0 |
| Divinyl PDMS 1 | 2.55 | 2.55 | 2.55 | 2.55 | 2.55 | 2.55 | 2.55 | 2.55 |
| TA 1 | 0.29 | 0.29 | 0.29 | 0.29 | 0.29 | 0.29 | 0.29 | 0.29 |
| TCF 3 (Al) | 50.26 | 50.26 | 50.26 | 48.58 | 48.58 | 50.26 | 48 | 48.66 |
| TCF 4 (Al) | 25.13 | 25.13 | 25.13 | 25.13 | 25.13 | 25.13 | 25.13 | 25.13 |
| TCF 2 (BN) | 0 | 0 | 0 | 0 | 0 | 0 | 0 | 1.62 |
| TCF 5 (ZnO) | 17.38 | 17.38 | 17.38 | 17.38 | 17.38 | 17.38 | 17.38 | 17.38 |
| TC filler 1 (BN) | 0 | 0 | 0 | 0 | 0 | 0 | 2.6 | 0 |
| Crosslinker 3 | 0.02 | 0.015 | 0.015 | 0 | 0.015 | 0 | 0 | 0.015 |
| CE 1 | 0.93 | 0.73 | 0.9 | 0.73 | 0.9 | 0.8 | 0.8 | 0.9 |
| Crosslinker 2 | 0 | 0 | 0 | 0 | 0 | 0.01 | 0.01 | 0 |
| Crosslinker 4 | 0 | 0 | 0 | 0.054 | 0 | 0 | 0 | 0 |
| Pt Catalyst 1 | 0.22 | 0.22 | 0.22 | 0.22 | 0.22 | 0.22 | 0.22 | 0.22 |
| Inhibitor 1 | 0.09 | 0.09 | 0.09 | 0.09 | 0.09 | 0.09 | 0.09 | 0.09 |
| Characterization | | | | | | | | |
| SiH/Vi ratio | 0.93 | 0.73 | 0.89 | 0.73 | 0.79 | 0.74 | 0.74 | 0.89 |
| SiH CE/SiH crosslinker ratio | 18.6 | 19.5 | 24 | 19.5 | 26.7 | 13.8 | 13.8 | 24 |
| TC (W/m*K) | 5.11 | 6.0 | 6.0 | 5.05 | 6.0 | 6.0 | 6.2 | 6.2 |
| BLT (μm) | <30 | <30 | <30 | <30 | <30 | <30 | <30 | <30 |
| TI (° C.*cm²/W) | 0.07 | 0.06 | 0.05 | 0.06 | 0.05 | 0.05 | 0.09 | 0.05 |
| VDP | Pass | Pass | Pass | Pass | Pass | Pass | Pass | Pass |

| | Sample | | | | | | | |
|---|---|---|---|---|---|---|---|---|
| | 16 | 17 | 18 | 19 | 20 | 21 | 22 | 23 |
| Component | | | | | | | | |
| TA 3 | 2.9 | 2.9 | 2.9 | 2.9 | 2.9 | 2 | 2 | 2 |
| TA2 | 0 | 0 | 0 | 0 | 0 | 1 | 1 | 1 |
| Divinyl PDMS 1 | 2.55 | 2.55 | 2.55 | 2.55 | 2.55 | 3 | 3.3 | 2.55 |
| TA 1 | 0.29 | 0.29 | 0.29 | 0.29 | 0.29 | 0.29 | 0.29 | 0.29 |
| TCF 3 (Al) | 48.66 | 47.58 | 44.34 | 48.58 | 48.58 | 50.28 | 50.28 | 50.28 |
| TCF 4 (Al) | 25.13 | 25.13 | 25.13 | 25.13 | 25.13 | 25.13 | 25.13 | 25.13 |
| TCF 2 (BN) | 0 | 3.02 | 3 | 3.02 | 3.02 | 0 | 0 | 0 |
| TCF 5 (ZnO) | 17.38 | 17.38 | 17.38 | 17.38 | 17.38 | 17.38 | 17.38 | 17.38 |
| TC filler 1 (BN) | 2 | 0 | 1.6 | 0 | 0 | 0 | 0 | 0 |
| Crosslinker 3 | 0.015 | 0.015 | 0.015 | 0 | 0.015 | 0.015 | 0.005 | 0.006 |
| CE 1 | .9 | 0.9 | 0.9 | 0.8 | 0.9 | 0.5 | 0.2 | 1.05 |
| Crosslinker 2 | 0 | 0 | 0 | 0.01 | 0 | 0 | 0 | 0 |
| Crosslinker 4 | 0 | 0 | 0 | 0 | 0 | 0 | 0 | 0 |
| Pt Catalyst 1 | 0.22 | 0.22 | 0.22 | 0.22 | 0.22 | 0.22 | 0.22 | 0.22 |
| Inhibitor 1 | 0.09 | 0.09 | 0.09 | 0.09 | 0.09 | 0.09 | 0.09 | 0.09 |
| Characterization | | | | | | | | |
| SiH/Vi ratio | 0.89 | 0.89 | 0.89 | 0.74 | 0.79 | 0.41 | 0.16 | 1.0 |
| SiH CE/SiH crosslinker ratio | 24 | 24 | 24 | 13.8 | 26.7 | 40 | 16 | 70 |
| TC (W/m*K) | 6.3 | 6.5 | 6.5 | 6.5 | 6.5 | 5.25 | 5.37 | 5.10 |
| BLT (μm) | <30 | <30 | <30 | <30 | <30 | <30 | <30 | <30 |
| TI (° C.*cm²/W) | 0.045 | 0.05 | 0.05 | 0.09 | 0.05 | 0.055 | 0.05 | 0.05 |
| VDP | Pass | Pass | Pass | Pass | Pass | Pass | Pass | Pass |

What is claimed is:

1. A thermal interface material composition comprising:
   a. a divinyl polydimethylsiloxane having a viscosity of 30 to 200 milliPascal*seconds;
   b. a chain extender that is a linear polysiloxane having two terminal silyl hydride functionalities, one at each end of the molecule;
   c. a crosslinker that is a polysiloxane having more than two silyl hydride functionalities;
   d. 80 volume-percent or more of thermally conductive filler;
   e. a treating agent composition comprising an alkyltrialkoxysilane and a mono-trialkoxysiloxy terminated and trimethylsiloxy terminated dimethylpolysiloxanes with a degree of polymerization of 20-120;
   f. a platinum hydrosilylation catalyst;
   g. up to 0.2 weight-percent hydrosilylation inhibitor; and
   wherein weight-percent values are relative to thermal interface material composition weight, volume-percent values are relative to thermal interface material composition volume, the molar ratio of silyl hydride groups to vinyl groups in the thermal interface material composition is 0.4 or more and at the same time is 1.0 or less, and the molar ratio of silyl hydride functionality from the chain extender to silyl hydride functionality from the crosslinker is 13 or more and at the same time 70 or less.

2. The thermal interface material composition of claim 1, wherein:
   a. the divinyl polydimethylsiloxane is present at a concentration of 2 to 4 weight-percent;
   b. the chain extender is present at a concentration of 0.5 to 1.5 weight-percent; and
   c. the crosslinker is present at a concentration of 0.005 to 0.05 weight-percent;
   d. the alkyltrialkoxysilane is present at a concentration of 1.8 to 4 weight-percent and the mono-trialkoxy terminated dimethyl polysiloxane is present at a concentration of 0.05 to 0.5 weight-percent;
   wherein weight-percent values are relative to thermal interface material composition weight.

3. The thermal interface material composition of claim 1, wherein the thermally conductive filler comprises zinc oxide particles with an average size of less than one micrometer, aluminum filler with an average particle size between one and 20 micrometers and optionally boron nitride flake with a particle size of 8 to 30 micrometers.

4. The thermal interface material composition of claim 3, wherein the boron nitride particles are present at a concentration of one to 10 weight-percent relative to thermal interface material composition weight.

5. The thermal interface material composition of claim 3, wherein the thermally conductive filler comprises 44 to 48.6 wt % aluminum filler with a D50 of 9 micrometers, 25 to 26 wt % aluminum filler with a D50 of 2 micrometers, 17-18 wt % zinc oxide with a D50 of 0.2 micrometers, 3 to 4 wt % boron nitride flake with an average size of 30 micrometers and up to 1.6 or even up to 2.0 wt % boron nitride flake with an average size of 8 micrometers, with wt % relative to TIM composition weight.

6. The thermal interface material composition of claim 1, wherein the chain extender is a silyl hydride terminated polydimethylsiloxane.

7. The thermal interface material composition of claim 6, wherein the crosslinker has the following average chemical structure: $(CH_3)_3SiO-[H(CH_3)SiO]_y-[(CH_3)_2SiO]_x-Si(CH_3)_3$, where the average value of y is 3 or more and the value of x is such that the crosslinker has a viscosity of 10-25 milliPascal*seconds.

8. The thermal interface material composition of claim 1, wherein the thermal interface material composition is free of organic solvent.

9. A process comprising dispensing the thermal interface material composition of claim 1 onto a substrate.

10. An article comprising the thermal interface material composition of claim 1 disposed onto a substrate.

* * * * *